United States Patent
Erlandsson-Warvelin et al.

(10) Patent No.: US 8,417,363 B2
(45) Date of Patent: Apr. 9, 2013

(54) CONTROL METHOD FOR MACHINES, INCLUDING A SYSTEM, COMPUTER PROGRAM, DATA SIGNAL AND GUI

(75) Inventors: Mats Erlandsson-Warvelin, Knivsta (SE); Henrik Knobel, Täby (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/562,573

(22) PCT Filed: Jun. 22, 2004

(86) PCT No.: PCT/SE2004/001009
§ 371 (c)(1),
(2), (4) Date: Dec. 27, 2005

(87) PCT Pub. No.: WO2004/113030
PCT Pub. Date: Dec. 29, 2004

(65) Prior Publication Data
US 2007/0108109 A1    May 17, 2007

(30) Foreign Application Priority Data

Jun. 26, 2003 (SE) ...................... 0301910

(51) Int. Cl.
| | |
|---|---|
| G05B 11/01 | (2006.01) |
| G05B 19/18 | (2006.01) |
| G06F 7/00 | (2006.01) |
| G06F 19/00 | (2011.01) |

(52) U.S. Cl. ............ 700/56; 700/20; 700/214; 700/230; 700/245; 901/7; 901/8

(58) Field of Classification Search .................. 700/214, 700/231, 245, 249, 19, 20, 112, 115, 121, 700/225, 230, 275, 247, 56; 901/8, 14, 7
See application file for complete search history.

(56) References Cited

U.S. PATENT DOCUMENTS

| | | | |
|---|---|---|---|
| 4,580,207 A | * | 4/1986 | Arai et al. ..................... 700/169 |
| 4,768,462 A | | 9/1988 | Kuronaga et al. |

(Continued)

FOREIGN PATENT DOCUMENTS

| | | |
|---|---|---|
| EP | 0092433 A1 | 10/1983 |
| EP | 0667124 A1 | 8/1995 |

(Continued)

OTHER PUBLICATIONS

Notice of rejection issued by Japanese patent office in counterpart application 2006-517051, Apr. 20, 2010.

(Continued)

*Primary Examiner* — Mohammad Ali
*Assistant Examiner* — Jennifer L Norton
(74) *Attorney, Agent, or Firm* — Venable LLP; Eric J. Franklin

(57) ABSTRACT

A method for controlling a group of machines such as robots or pick and place machines to pick up an item from a first position and place the item in a second position. Information from a sensor about the location of the first position is provided to a control member, which sends a message from a master process to all machines. The message includes a list of all first positions. The machines dynamically and adaptively handle each of the first positions and inform the master process when each first position is handled. The master process in turn informs all machines that a given first position has been handled. A system, a computer program and a graphical user interface are also described.

15 Claims, 13 Drawing Sheets

U.S. PATENT DOCUMENTS

| | | | | |
|---|---|---|---|---|
| 4,942,512 | A | * | 7/1990 | Kohno .................... 700/4 |
| 5,040,056 | A | * | 8/1991 | Sager et al. ............... 348/88 |
| 5,041,907 | A | | 8/1991 | Sager et al. |
| 5,568,593 | A | * | 10/1996 | Demarest et al. ......... 700/247 |
| 5,914,880 | A | * | 6/1999 | Yasojima et al. .......... 700/159 |
| 6,081,981 | A | * | 7/2000 | Demarest et al. ......... 29/407.08 |
| 6,122,895 | A | | 9/2000 | Schubert |
| 6,401,936 | B1 | | 6/2002 | Isaacs et al. |
| 6,804,580 | B1 | * | 10/2004 | Stoddard et al. .......... 700/248 |
| 6,971,161 | B1 | * | 12/2005 | Maenishi et al. .......... 29/832 |
| 7,024,250 | B2 | * | 4/2006 | Graf et al. ................ 700/19 |
| 8,315,736 | B2 | * | 11/2012 | Kalbavi et al. ............ 700/250 |
| 2001/0011197 | A1 | * | 8/2001 | White ..................... 700/96 |

FOREIGN PATENT DOCUMENTS

| | | |
|---|---|---|
| JP | 62-247857 | 10/1987 |
| JP | 02-088154 | 3/1990 |
| JP | 05-123943 | 5/1993 |
| JP | 08-56950 | 3/1996 |
| JP | 8-336784 | 12/1996 |
| JP | 9-72717 | 3/1997 |
| JP | 09-131683 | 5/1997 |
| JP | 9-290392 | 11/1997 |
| JP | 2000-141047 | 5/2000 |
| JP | 10-218104 | 9/2000 |
| JP | 2002-37441 | 2/2002 |
| JP | 2002-192486 | 7/2002 |
| WO | WO 9944171 A1 | 9/1999 |
| WO | WO 0124618 A1 | 4/2001 |

OTHER PUBLICATIONS

Notice of Rejection from the Japanese Patent Office, dated Sep. 21, 2010, issued in connection with counterpart Japanese Patent Application No. 2006-517051 (w/English translation).

* cited by examiner

CONTROL METHOD FOR MACHINES, INCLUDING A SYSTEM, COMPUTER PROGRAM, DATA SIGNAL AND GUI

CROSS-REFERENCE TO RELATED APPLICATIONS

This application claims priority under 35 USC §119 to Swedish patent application no. 0301910-6 filed on 26 Jun. 2003 and is the national phase application of PCT/SE2004/001009 under 35 U.S.C. §371.

TECHNICAL FIELD

The invention relates to a method and system for controlling an industrial machine so as to perform operations for moving items from one place to another or to packing the items in containers. In particular, the system is concerned with pick and place machines including industrial robots or manipulators.

BACKGROUND ART

The invention relates to a system for extracting an object out of a plurality of objects. The objects may be static or in a continuous production flow. With objects in this context should be understood both objects which are identical as well as object or groups of objects that are different in shape, colour softness and such. The objects are placed or may arrive into the working sphere of a robot in layers of a pallet, on a rotating plate or the like, enter as continuous stream on a conveyor. A common task carried out by a machine of a such system is a task that is commonly called pick and place. Pick and place tasks include picking up objects from a conveyor belt and placing them on a shipping pallet or picking up objects and placing them in a shipping carton. A well known example is that of picking up chocolates from a conveyor belt, and placing them in a packing tray or a chocolate box.

U.S. Pat. No. 6,401,936, entitled Divert apparatus for conveyor system, describes a divert apparatus for a conveyor system. This is a sorting system for processing a disordered stream of items including three-dimensional non-flat articles. The apparatus regulates the flow of articles through the system by producing a stream of single items spaced from each other from a disordered stream in a so-called singulating process. There is also means for mechanically increasing the spacing between the items and a gate for discharging articles from the stream. The known system is designed for one type of articles only. However, when changing the type of object or distribution of object types included in production the apparatus has to be mechanically re-adjusted.

SUMMARY OF THE INVENTION

The present invention solves one or more of the above problems. In a first aspect of the invention, a method is provided for controlling a machine to pick up an item from a first position and place the item in a second position, wherein a sensor member provides data on said first position to a control member arranged for: sending a message from a master process of the control member comprising one or more said first positions to all said machines controlled by said control member; sending a message from said control member to all said machines with an indicator member specifying which of the one or more said first positions shall be handled; and receiving a message from a said machine with a status that the first position has been used.

In another aspect of the invention, a system is provided with a master control member and with a control member for operating a group of machines so as to carry out the methods of the invention and adaptively move objects from a first position to a second position.

The invention describes a new process function, which is used for dynamically sharing object positions between a plurality of machines, preferably and not exclusively robots, manipulators, or pick and place machines, in order to complete a task. The positions may be of individual objects, objects organized in patterns or free object positions, i.e. positions where objects shall be placed. The objects may be the same, similar or different. The positions can be placed on conveyors or any other object frame—fixed or moving.

In another embodiment, the invention describes a new solution for efficient distribution of such positions among a plurality of robots. In a further and advantageous embodiment, load balancing is carried out among the robots handling the positions.

In another aspect of the invention a computer program is described for carrying out the method according to the invention. In another aspect of the invention a computer program product comprising a computer program for carrying out the method of the invention is described.

In another, further aspect of the invention a computer data signal embodied in a carrier wave is described according to the invention.

In another yet further aspect of the invention a graphical user interface is described according to the invention.

The principal advantage of the invention is that the objects are handled efficiently by a group of machines or robots. The process is adaptive and ensures that that one and only one of the robots handle each position. The order in which the positions are handled is independent of which individual robot or machine is handling the position. The positions can be placed on conveyors or any other object frame—fixed or moving.

Another advantage of the methods described in the invention is that it is robust in terms of individual machine stoppages in an installation, since all machines always receive all positions and only successful positions are reported back from the active machines. A machine or robot, which is no longer running or is switched off, etc., cannot report a successful operation.

A further advantage is that load balancing may, if required, also be carried out which may be used to distribute the tasks evenly between machines in a production group or work group. This has the advantage of spreading the wear on machines evenly and of providing a degree of redundancy by balancing load levels below the maximum capacities of the machines. This also provides a simple and economic method to balance loads for downstream operations.

The methods and systems of the invention are especially advantageous in respect of flexible manufacturing. This is because changes in type or extent of production handled may be adjusted for primarily by re-configuring or re-programming, thus without the elaborate or expensive mechanical or electrical alterations to equipment and/or layout generally required by some devices of the prior art. The benefits of the invention are also not limited to new machines or installations but may also beneficially be retrofitted to existing installations.

BRIEF DESCRIPTION OF THE DRAWINGS

A more complete understanding of the method and system of the present invention may be had by reference to the following detailed description when taken in conjunction with the accompanying drawings wherein.

DESCRIPTION OF THE PREFERRED EMBODIMENTS

Figure 1:
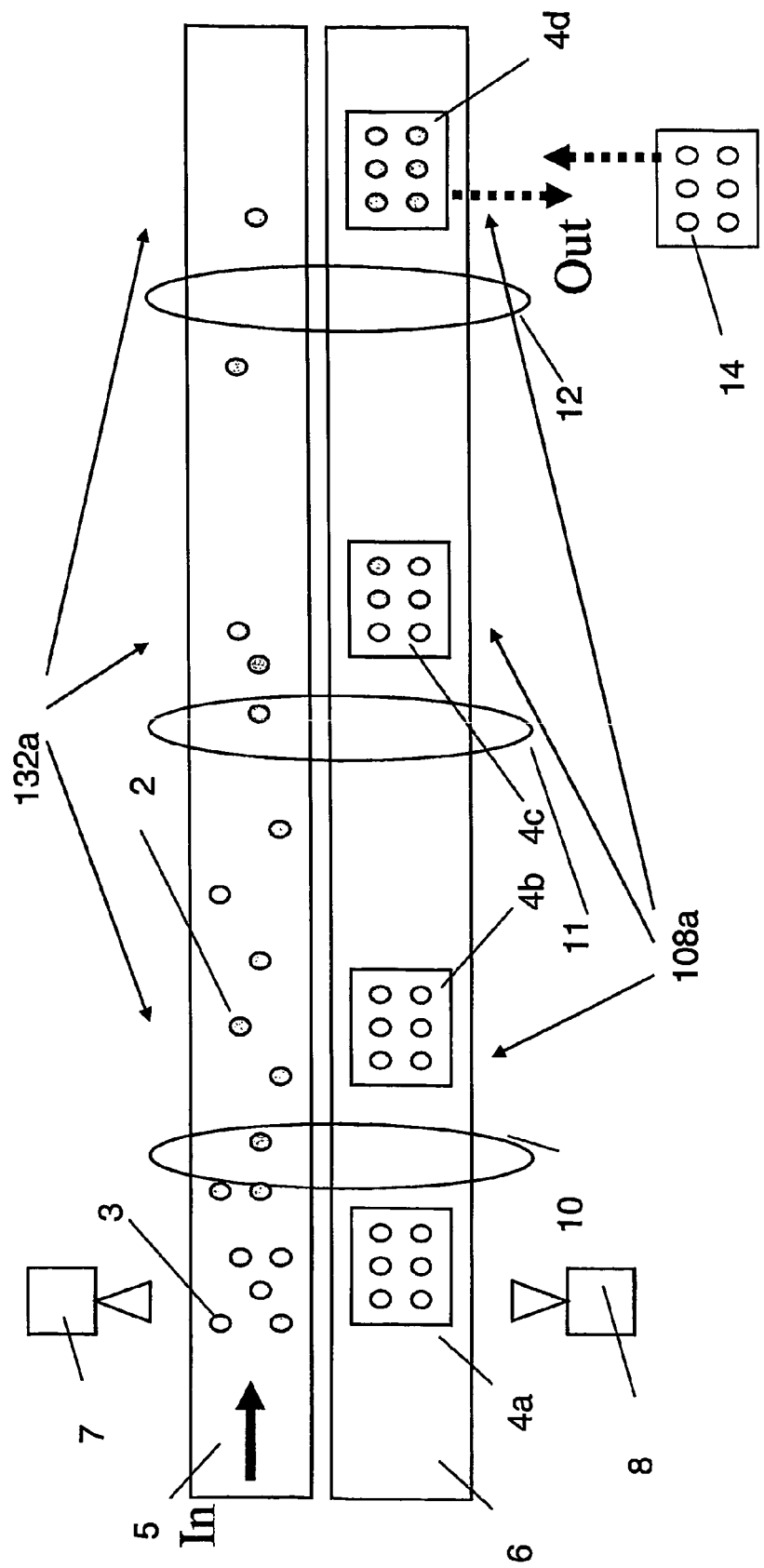
FIG. 1 shows in a schematic diagram an adaptive filling procedure for stationary containers of a system for moving items from a first position to a second position according to an embodiment of the invention.

FIG. 1 shows two sensors 7, 8 and a first area comprised by a conveyor belt 5. Three machines (not shown) each have a work area in a working sphere indicated by the circles 10, 11, 12. A series of items such the single item indicated as 2 are placed on the conveyor belt 5. When an item is first registered by a sensor 7 or 8 this called a first position 3 of the item. The first position 3 is identified and communicated to a control system (not shown). Subsequently the items 2,3 are each transferred by one of the machines 10 or 11 or 12 into a second position, which in this example is a one of a plurality of containers, 4a or 4b or 4c or 4d. The conveyor belt 5 moves items into the working areas A10, A11, A12 of the pick and place machines from left to right as indicated by the arrow in the figure. However, the items could just as well be placed or dropped on the belt when stationery periodically without moving the conveyor belt in order to carry out a static filling in the adaptive way described. For example, in a batch operation, full containers may be removed from the machines working area as indicated for container 4D and empty containers placed in the working area as per container 14. In this description the machines described may be any of manipulators, robots, robots of the Flex Picker™ type supplied by ABB, pick and place machines or equivalent. The group of machines working together is called a work group or, as the work group is adaptively carrying out work, an adaptive task completion group, Atc.

Figure 2:
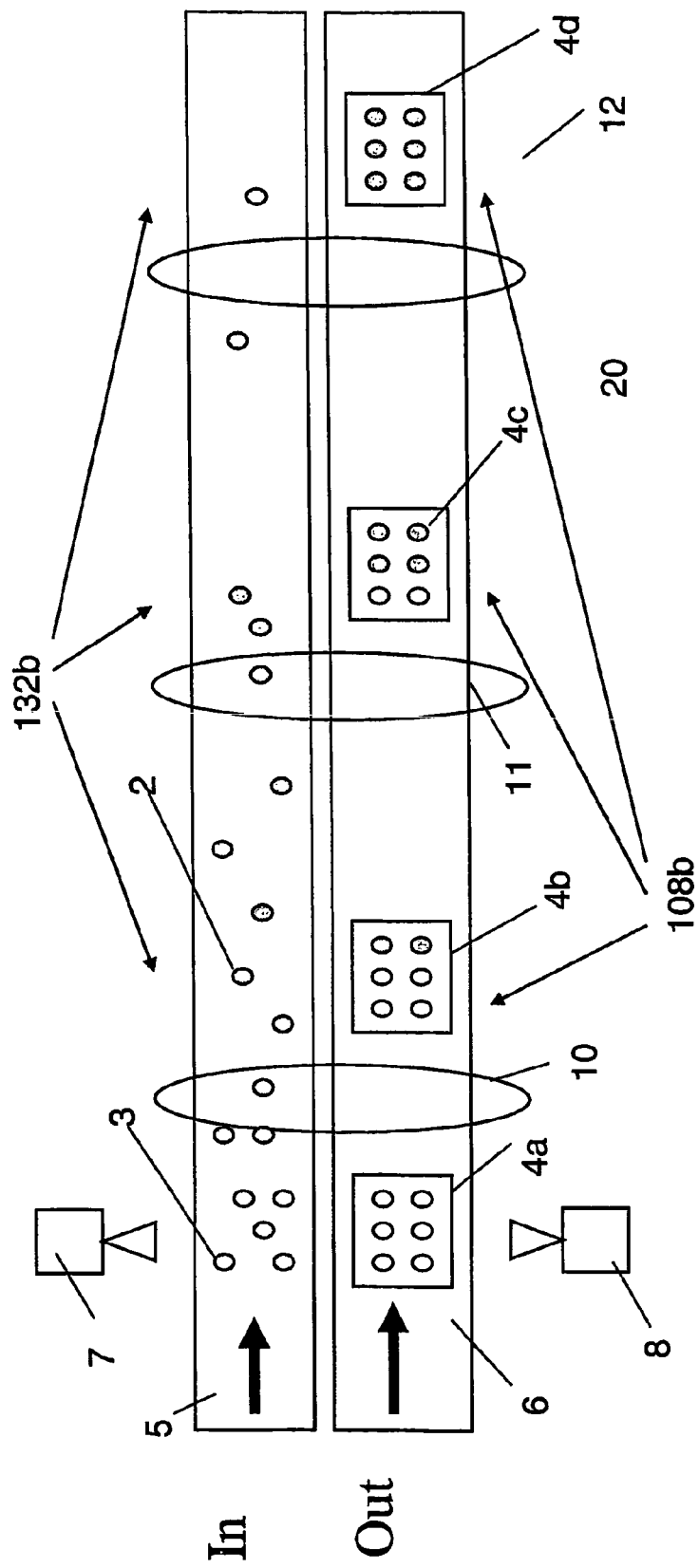
FIG. 2 shows in a schematic diagram an adaptive filling procedure for moving containers of a system for moving items from a first position to a second position according to a further embodiment of the invention.

FIG. 2 shows in a second embodiment a dynamic adaptive filling where at least one conveyor belt is moving, and where two or more transport members such as conveyor belts may be involved. A first conveyor 5 is arranged moving past the working areas A10, A11, A12 of three machines 10, 11, 12 (not shown). Items 2 on a moving conveyor 5 are sensed by a sensor 7 or 8 when they enter a first position 3. Any one of the machines 10, 11, 12 may pick up the item 2, 3 etc and place it in a second position which is in one of the containers 4a, 4b, 4c or 4d, once a master process 40 (described in detail below) has instructed the machines by means of the list that the first position(s) exist.

In a further embodiment, a second conveyor 6 moves the containers 4a-4d away from the working areas A10-A12 of the machines. It can be seen from the figure that the containers 4a-d are each progressively filled in an adaptive way by more than one machine as they travel past all working areas 10, 11, 12. At the point where the container leaves, in this example, the working area of machine 12, the container (4d) has been completely filled.

Figure 3:
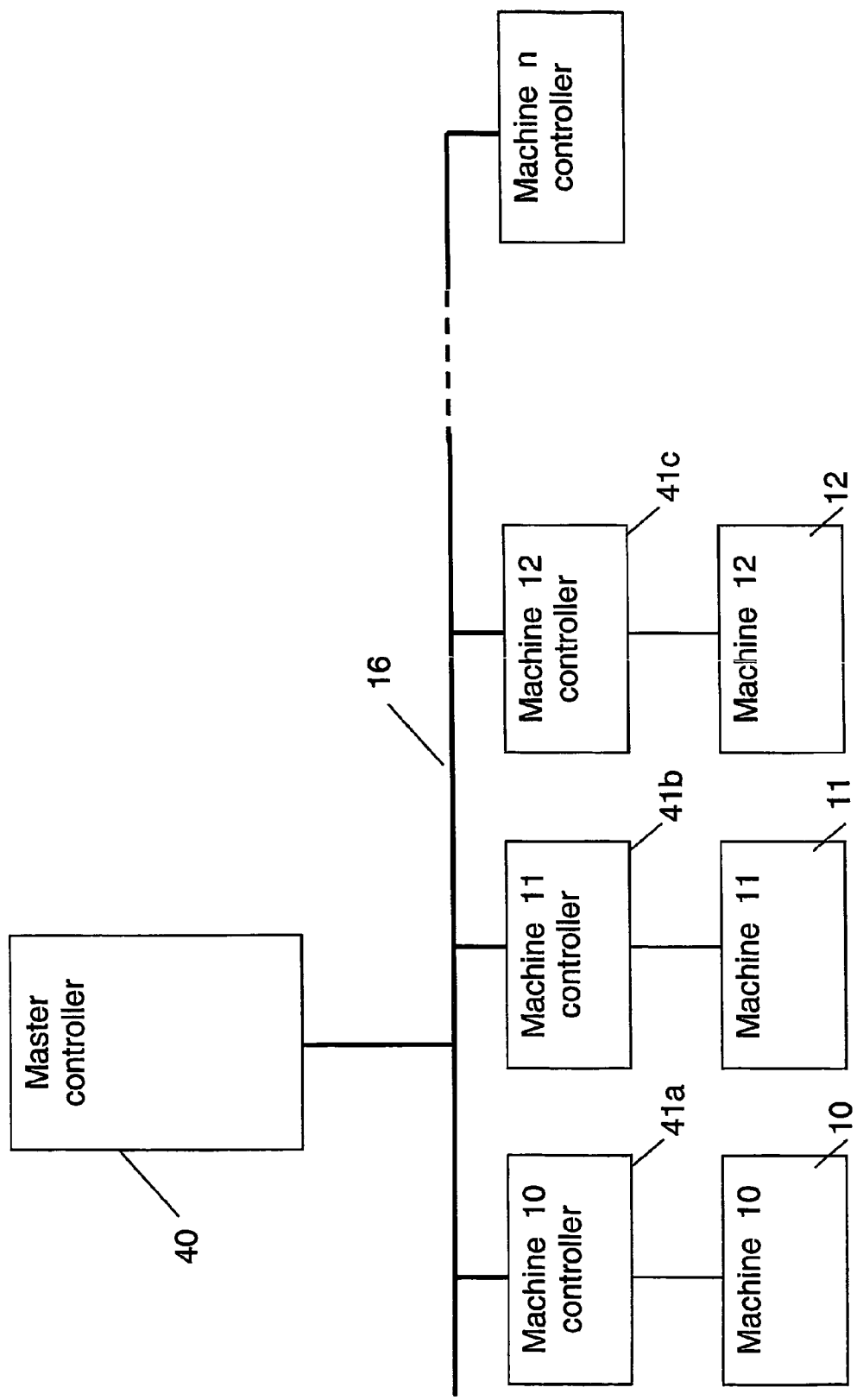
FIG. 3 shows a schematic block diagram for a master control process and a plurality of machine controllers in a system according to an embodiment of the invention.

FIG. 3 shows in a block diagram a schematic representation of the system for controlling a plurality of machines. A Master process 40 is shown, which is connected by a network member 16 to the controllers of a plurality of machines 10-$n$. The master process 40 may run as a part of one or more computer programs comprising a control system or run as a separate application with data connections to the control system. Each machine controller 41a,b,c comprises a list of all first positions, marked either to be handled or marked as consumed. In the case of a process that also includes load balancing, each position in the list is marked with an additional indicator identifying which of the machines, in this example, which of 10, 11, or 12, shall handle any given first position.

The system for controlling a plurality of pick and place machines 10-12 has the following elements:
a computer, which is connected to all machine controllers, has a process, which is called the Master process 40. The first positions 3 (see FIG. 1-3) are registered in one position on the conveyor 5 ahead of the first machine 10 in conveyor direction. Each first position registered by the system is given a unique identity. The Master process 40 keeps a list of all first positions. The first positions are marked with a status. The status shows whether a machine has consumed the first position or not.

Each machine controller 41a, 41b, 41c keeps a list of its own. The first positions in the list in each machine controller contain a status. The Master process 40 or the machine controller (41a or 41b or 41c) can change the status. The process is achieved by the following means:
 the Master sends all first positions to all machine controllers;
 the Master marks the positions sent to the machine controllers with a status telling if they shall be used;
 the machine controller, when a machine has used (handled) a first position, then marks the corresponding position as used (consumed) and sends a message to the Master;
 the Master marks the corresponding position in the master list as used and sends a message to all machine controllers saying that the position has been used;
 each machine that receives the "Position Used" message then marks the corresponding positions in the copy of the list held by the machine or robot as used.

None of the machines therefore will attempt to handle the position, or use the position, again.

The advantage with the process described in the invention is that it is robust by means of individual machine stoppages in an installation, since all machines always receive all positions and only successful positions are reported back from the active machines. A machine or robot, which is no longer running or is switched off, etc cannot incorrectly report a successful operation.

An additional development of the invention is the possible inclusion of a synchronisation method. By triggering the first positions more than one time, the accuracy of the already registered first position can be corrected, if necessary, and the precision increased. This may be achieved either through use of a global trigger for all robots, such as a time stamp, to which all robots synchronised to. This covers for possible changes in the environment, slack in the conveyor belt, an object removed from a work area by an inspector or client, and gives a second check on the position and/or more accuracy in the registration of the first position. In a further development a second trigger may be arranged beside each machine. When very high precision is required a second sensor or camera may be included beside every machine for great accuracy of location of the first positions.

Figure 5:
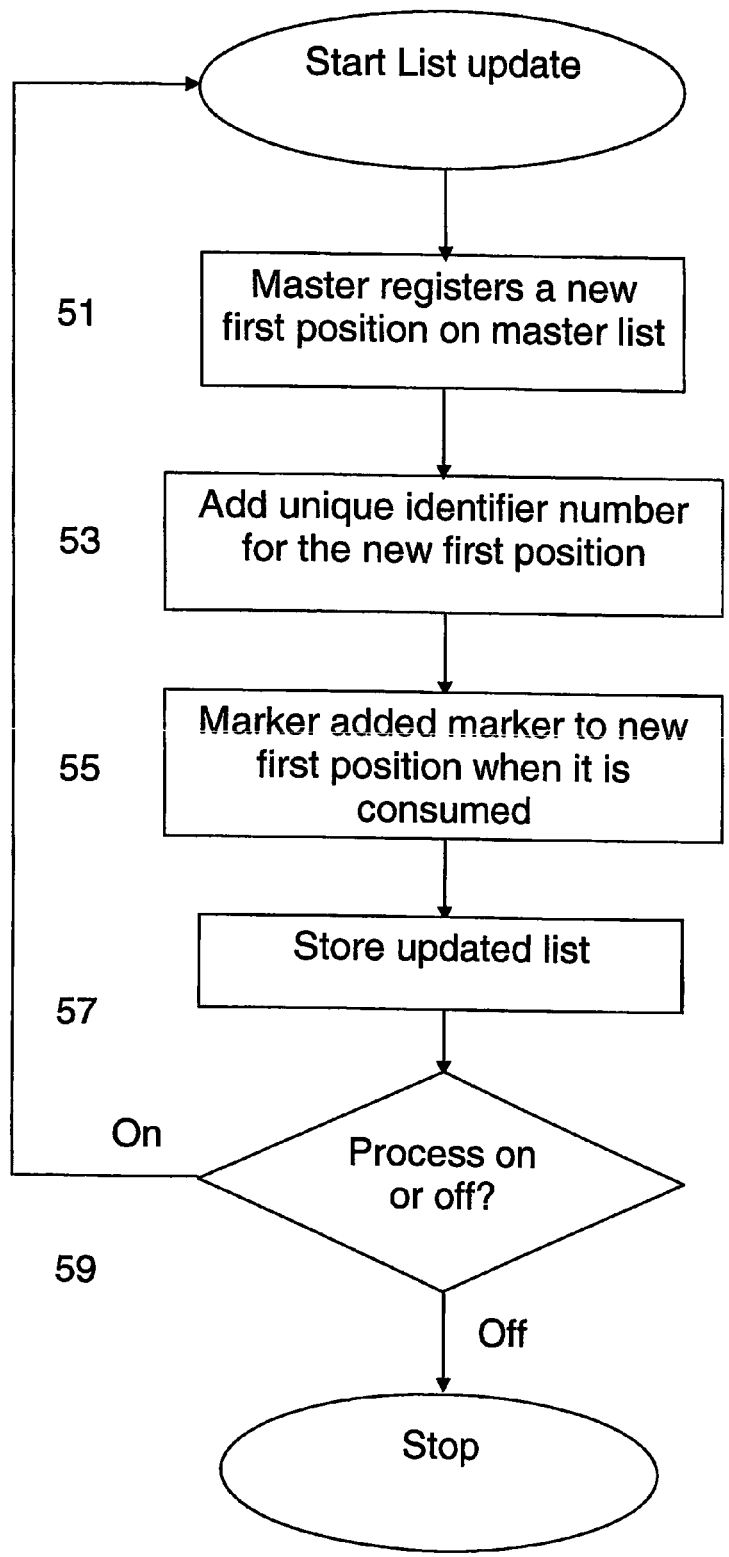
FIG. 5 shows a flowchart for the process carried out by the master controller and the plurality of machine controllers of a system.

FIG. 5 shows in a flowchart a process of the invention for controlling a plurality of machines. The List updating begins at step 51 with registering a new first position that a sensor, 7 or 8, has detected and measured the position of. At 53 a unique identifier, which may be a number, alpha-numeric string, a code or at least one symbol, is allocated to the new first position (such as indicated item 3 in FIGS. 1-3). At 55 a marker is added to the first position to show whether it has been handled by a machine—used, consumed—or not. At 57 an indicator is added to identify which individual machine of the whole group controlled shall handle the new first position. At 59 the updated list of all first positions, wherein all used positions are so marked, may be sent to all the machines in the group.

Figure 6:
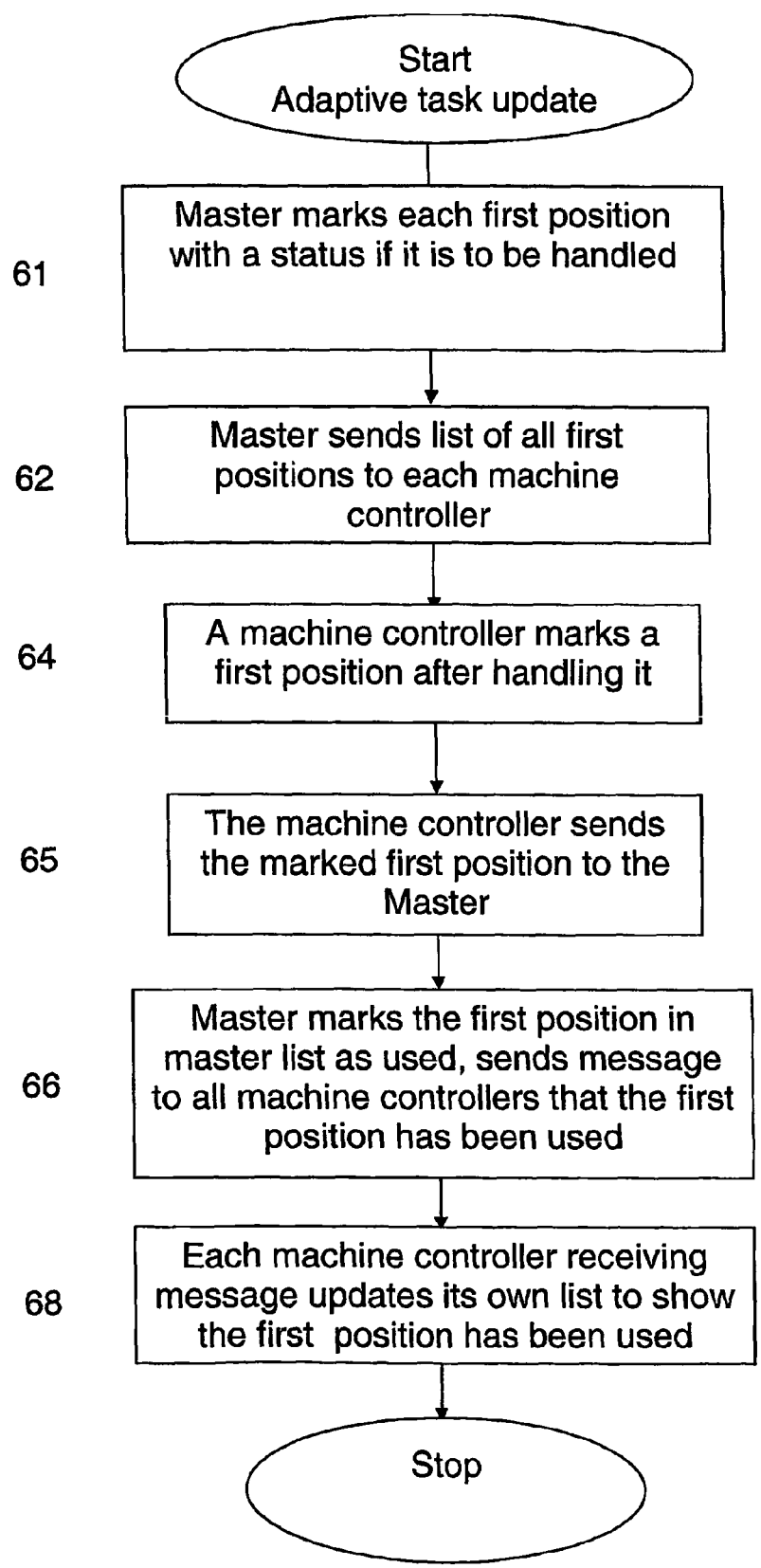
FIG. 6 shows a flowchart for a computer program to carry out a method for controlling a system for moving items from a first to a second position according to an embodiment of the invention.

FIG. 6 shows a flowchart for a method to control the machines according to a preferred embodiment of the invention. In step 61 the master process 40 (see FIG. 3), which may be a process running in a processor or computer, marks the positions in a list of all positions with a status indicating if those positions are to be handled (used). In step 62, the master control process 40 sends the current list of all first positions to all the controllers 41*a*, 41*b*, 41*c* ... 41*n* of all machines 10, 11, 12, ... n in the work group as a first step 61. When a machine 10, 11, 12, ... n or robot has handled the position, it marks its own copy of the list as position used in step 64. The machine controller of the handling machine then sends a message to the master control process 40 in step 65 reporting that the position is handled, used. The master control process 40 updates its list to show that the position has been used, then sends a message to all machines indicating that the respective first position in step 66 now has the status of used. Each machine or more particularly, each machine controller, then updates its own copy of the positions list to show that the respective position has been used.

Figure 4:
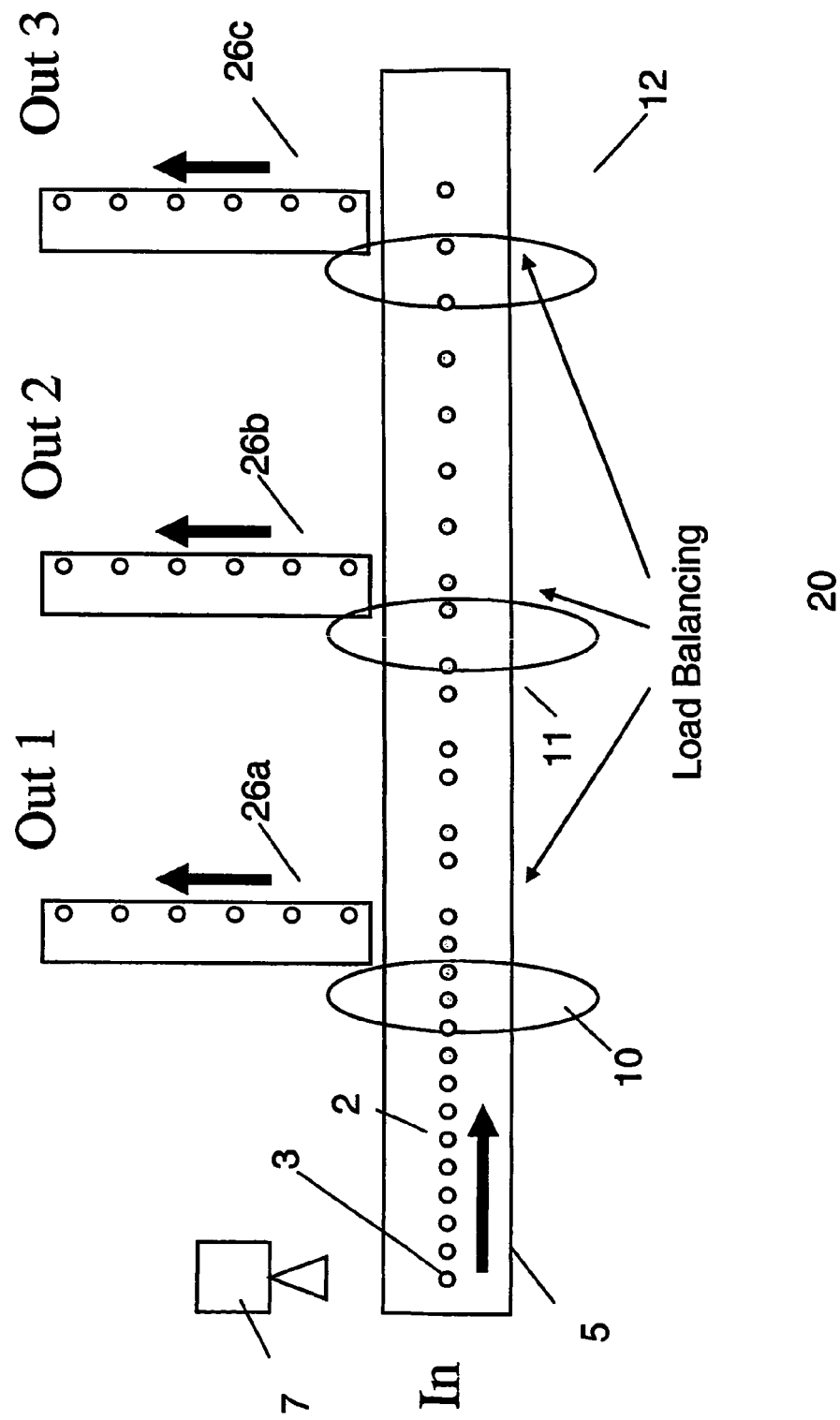
FIG. 4 shows in a schematic diagram a load balancing operation for an adaptive filling procedure of moving containers according to a further and advantageous embodiment of the invention.

FIG. 4 illustrates one example of how a load balancing can be carried out according to another aspect of the invention. A load comprising a flow of items 2 delivered on a transport conveyor 5 flows past working areas A10-A12 of three pick and place machines (not shown). Three other transport conveyors 26*a*, 26*b*, 26*c* move the items to another destination. Items 2 are identified in a first position 3 by a camera or other sensor 7. The first position 3 is identified and communicated to a control system (not shown). The control system calculates a balanced load to each of the three out conveyors 26*a-c* and instructs: which of the items shall be picked up and placed in a second position on one of the three out belts 26*a-c*; and, by which of the machines 10, 11, 12 (not shown). As items are picked up from a first position on belt 5 and placed in a second position on one of the belts 26*a-c* each of the belts 26*a-c* receives a similar and balanced load of items 2,3.

Figure 7:
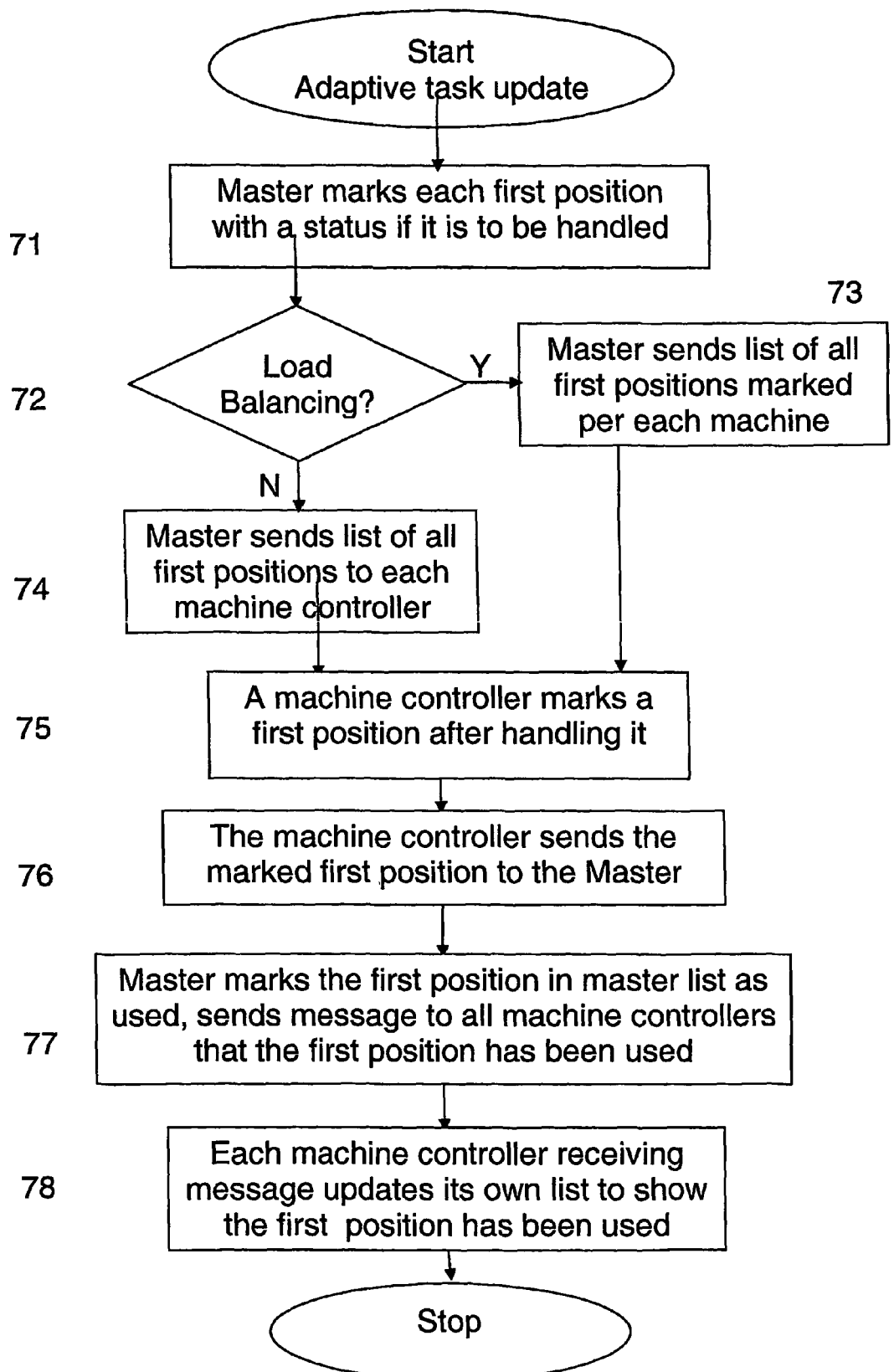
FIG. 7 shows a flowchart for a computer program to carry out a method in which a form of load balancing may take place, according to the further advantageous embodiment of the invention.

FIG. 7 shows a flowchart for the method of FIG. 6 with the addition of an option for a form of load balancing process. At 72 the process in the master control process 40 checks if load balancing is to be carried out on the present objects, first positions. A Yes decision results in the Master indicating for each first position in the list, which of the machines eg 10, 11, 12 shall handle each first position. In step 73 the lists thus marked are sent out and steps 76-78 are as before. A No decision results in the list being sent out to all machines in step 74 and steps 75-78 are as before 64-68 in FIG. 6.

Figure 8:
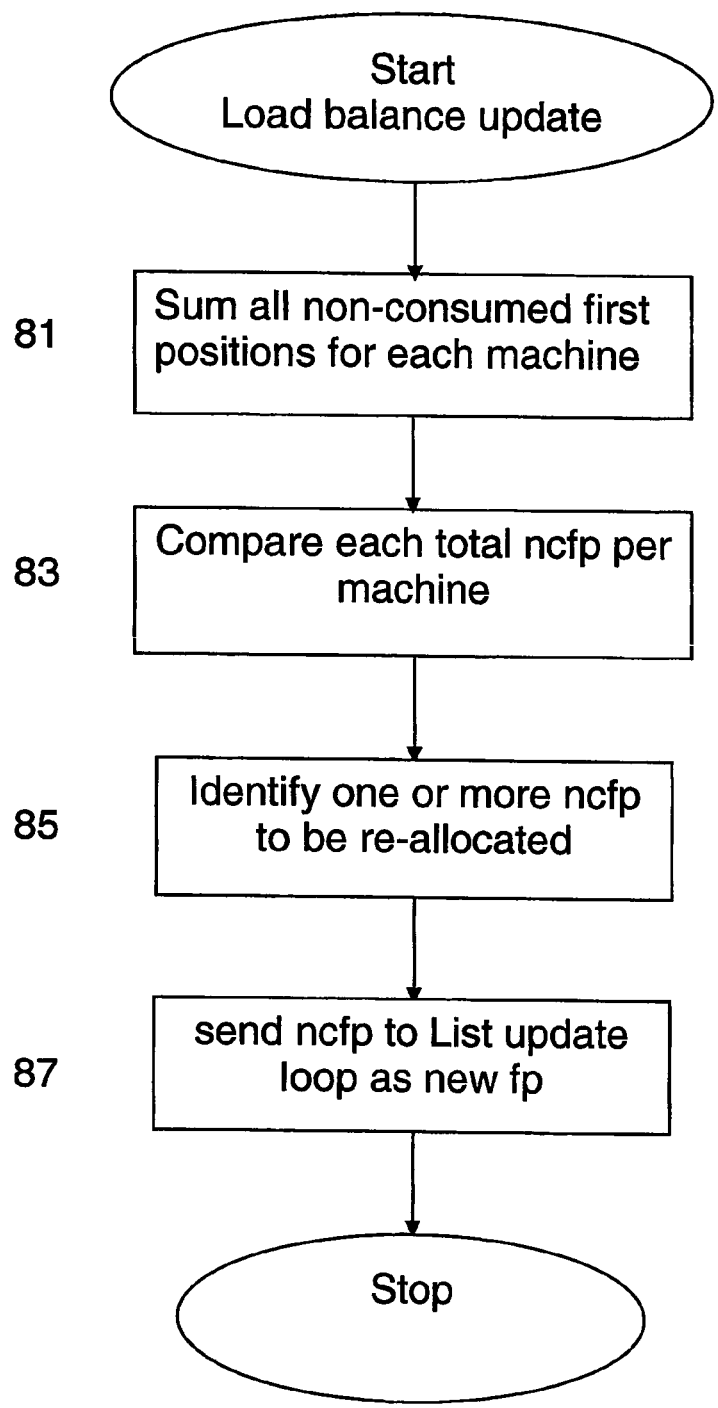
FIG. 8 shows a flowchart for a computer program to carry out a method for another form of balancing a load between a plurality of machines in a system according to an embodiment of the invention.

FIG. 8 shows a flowchart for another further optional load balancing process. The load balancing for all machines in the group starts at 81 when the sum of all non-consumed (unhandled) first positions is calculated by a computer process for each machine or pick and place robot. At 83 the total non-consumed (unhandled) first positions (ncfp) per machine is compared. An algorithm may be used for this purpose. At 85, one or more of the non-consumed (unhandled) first positions are chosen to be re-allocated, which may be done by means of an algorithm. At 87 the chosen non-consumed first position is found in the list of all first positions (FIG. 3) and the machine indicator is changed.

If so required, sorting of the objects may optionally be carried out for a selection of objects in a continuous production flow according to given sorting rules. A continuous production flow, which feeds objects into a robot working area is defined by the positive flow direction, hereafter named "X" and its perpendicular direction in the horizontal plane of a right-hand coordinate system, named "Y".

For example in a task to load objects into positions in X, Y and Z axis positions the robots each pick up and place the objects that they have time to pick up. As objects are placed in front of robots, or objects flow past robots on a conveyor belt a pallet or box or other container is incrementally loaded.

Figure 9:
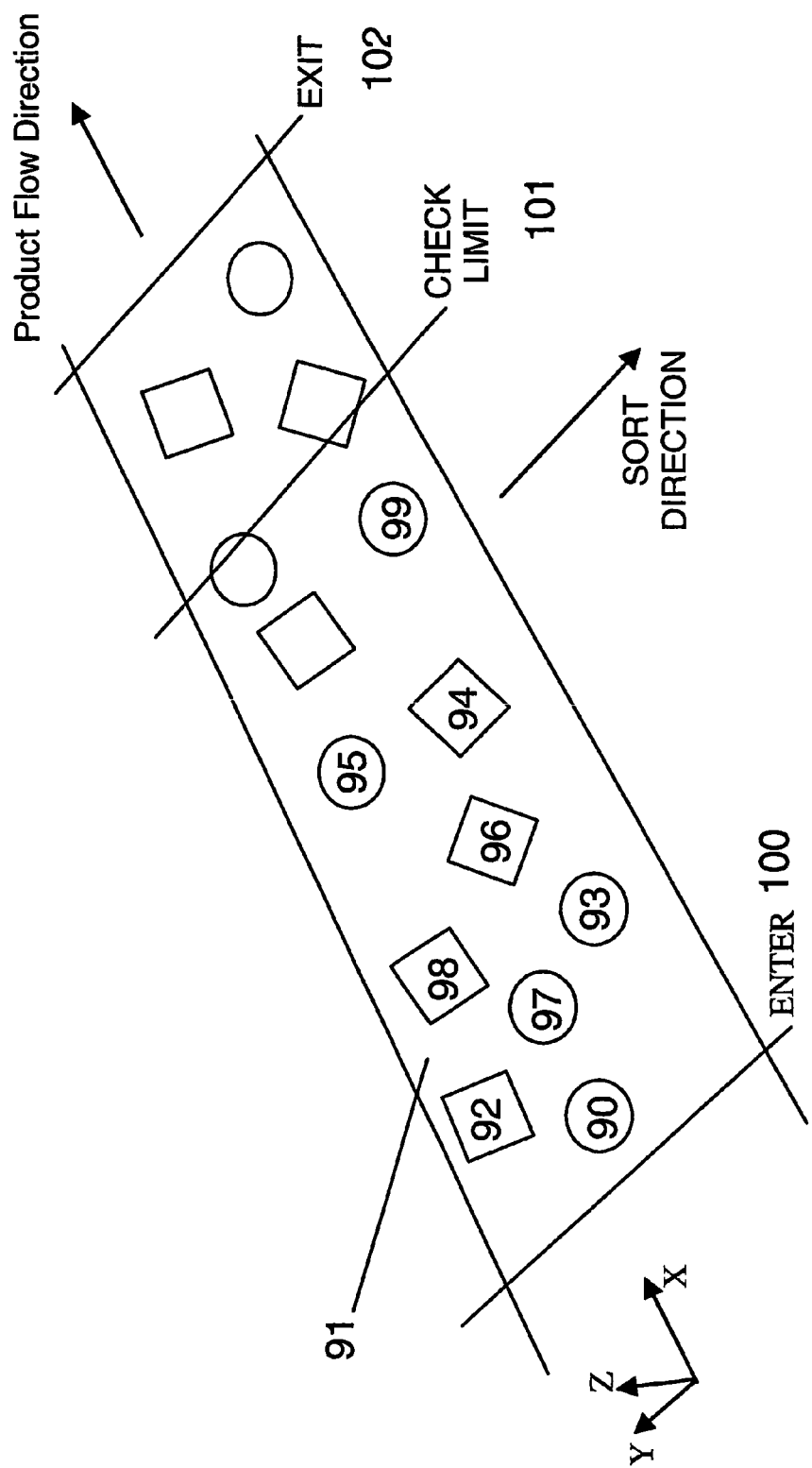
FIG. 9 shows schematically a method to select and/or sort objects for handling from a flow of moving objects.

FIG. 9 shows a method for sorting or selecting objects to be handled. In this embodiment a moving transport member, such as a conveyor belt moves objects past the machines is described, but a static adaptive fill, in which objects are periodically placed in front of the machines, may use the same algorithm somewhat modified. FIG. 8 shows a conveyor belt 91, a plurality of objects including objects 90-99, and two reference positions relative to the belt 91, being an Enter point 100 and a check limit 101. An exit position 102 is also marked. The direction of flow of the objects is indicated by arrow X and the sort direction, the direction the machines pick and move the objects to, is in the direction or arrow Y.

Information about all objects, such as position, orientation, type and size, are stored in a buffer in an industrial machine controller, some of which is supplied by sensor 7 or sensors 7 and 8. A new object is requested from the buffer when the machine or robot is about to use the object as a target, that is, when it becomes a first position. The robot operation can only be performed when the first position is within the entry and the exit limit of the X-direction. The machine controller (41*a*, 41*b*, 41*c*) of each machine (10, 11, 12) or robot supervises this. Within this work area it shall be possible to choose the object with respect to the priority rules in X- and Y- or/and Z-direction.

Preferred Information for Sorting:
Sort Direction:
From which direction the sorting will be done. Given in object request command;
Safety Distance:
The clearance area for sorting. Given in object request command;
Enter Limit:
The limit where the machine can start operate on an object. Given when defining a new object buffer;
Exit Limit:
The limit where the robot can't operate on an object. The objects will be erased from the buffer when they enter this limit. Given when defining a new object buffer;
Check Limit:
Optional limit where the robot can't operate on the object. The objects will not be erased from the buffer when they enter this. Given in object request command.

The sorting algorithm chooses the first position, which is the position of the object closest to the exit limit in X-direction and depending on the non-presence of other objects in direction of the sorting, the first position in the sort direction will be selected. A safety distance defines the required clearance area around an object. The algorithm will check both upwards and downwards the production flow for presence of other objects.

When a new object is requested from the object buffer, the sort direction and safety distance is given as parameters in the request command. The sorting algorithm will then choose which object the robot shall operate with.

By using a check limit, in the X-direction, as a parameter to the request command, it is possible to define the starting point from where the first object shall be extracted. The command will try to extract the first object between the check- and enter limit. This will have the effect that the sorting algorithm also takes all objects between the check limit and the exit limit into consideration when checking the safety distance for the nearest objects. By this inventive algorithm the objects can be extracted from the flow without touching surrounding objects. The objects can be shuffled sideways without any risk of bumping into other objects in the production flow.

It is possible to combine the directional sorting with type request. The first object of a certain type in the production flow will then be selected according to previous described algorithm.

Normally the production flow is in the horizontal plane. However there is no limitation to what direction the production flows. As an example the production flow can be vertical. This situation arises when the products arrive into the operation area on a pallet where the articles are piled individually or in layers. The detection information is then achieved from package pattern or by having the pallet moved between the detecting area and the operation area.

The sensor or sensors 7, 8 may be any suitable sensor. The sensor may be non-optical such as a magnetic, ultrasound, pressure or force transducer. An optical sensor may be any suitable optical sensor such as a photocell, an IR sensor, a video or CCD camera. A sensor may also comprise or be in some way connected to a computer application for processing signals or processing images to detect the presence of objects as required.

The methods described above may be carried out by means of one or more computer programs. In particular, the Master control process 40 comprising steps 61-68 of FIG. 6 may run in one or more computers or processors (not shown), which may be located in the proximity of the machines, robots or pick and place machines, or may otherwise be located remotely. The microprocessor (or processors) comprises a central processing unit CPU performing the steps of the method according to one or more aspects of the invention. This is performed with the aid of one or more computer programs, which are stored at least in part in memory accessible by the one or more processors. It is to be understood that the computer programs may also be run on one or more general purpose industrial microprocessors or computers instead of one or more specially adapted computers or processors.

The machine controllers 41a, 41b, 41c, comprise at least a memory member in which the individual machine copy of the list of all first positions is stored and updated. The controller may also comprise a processor of some sort for processing instructions for machine control such as of a computer program.

The computer program of the Master control process 40 and of the processes in the machine controllers 41a, 41b, 41c, both comprise a type of computer program code element or software code portion that make the computer or processor perform the method using equations, algorithms, data, lists and calculations previously described. A part of the program may be stored in a processor as above, but also in a ROM, RAM, PROM or EPROM chip or similar memory means. The program in part or in whole may also be stored on, or in, other suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media such as Sony memory stick and other removable flash memories, hard drives etc. may also be used.

The computer programs described may also be arranged in part as a distributed application capable of running on several different computers or computer systems at more or less the same time.

The control signals from the Master process 40 comprising instructions to the pick and place machine controllers 41a-c maybe transmitted over a LAN or other data network communication member to a standard such as any of: half or full duplex TCP/IP, Ethernet, a fieldbus, Profibus, Modbus, (CAN), Foundation Fieldbus (FF) or similar. The data network may be wireless at least in part, such as a WLAN, or using short range radio such as according to standards such as Bluetooth or the wireless Ethernet standard IEEE 802.11b, wireless ATM (Asynchronous Transfer Mode) network standard IEEE 802.11a or a standard according to HomeRF or any similar standard that may be used in industry. The signals may also be transmitted from a remote place and comprised in a computer data signal embodied on a carrier wave. The computer data signal may be transmitted in part to or from a portable computing device such as a laptop, a PDA, a suitably equipped mobile phone, or a controller or a Teach Pendant by any suitable wireless standard including IR and radio. The information in the computer data signal may be displayed in part by a graphical user interface of any of the portable computing devices named above or by a portable terminal. The computer program of the Master process and of the processes in the machine controllers may also be provided over any data network including the Internet.

Figure 10:
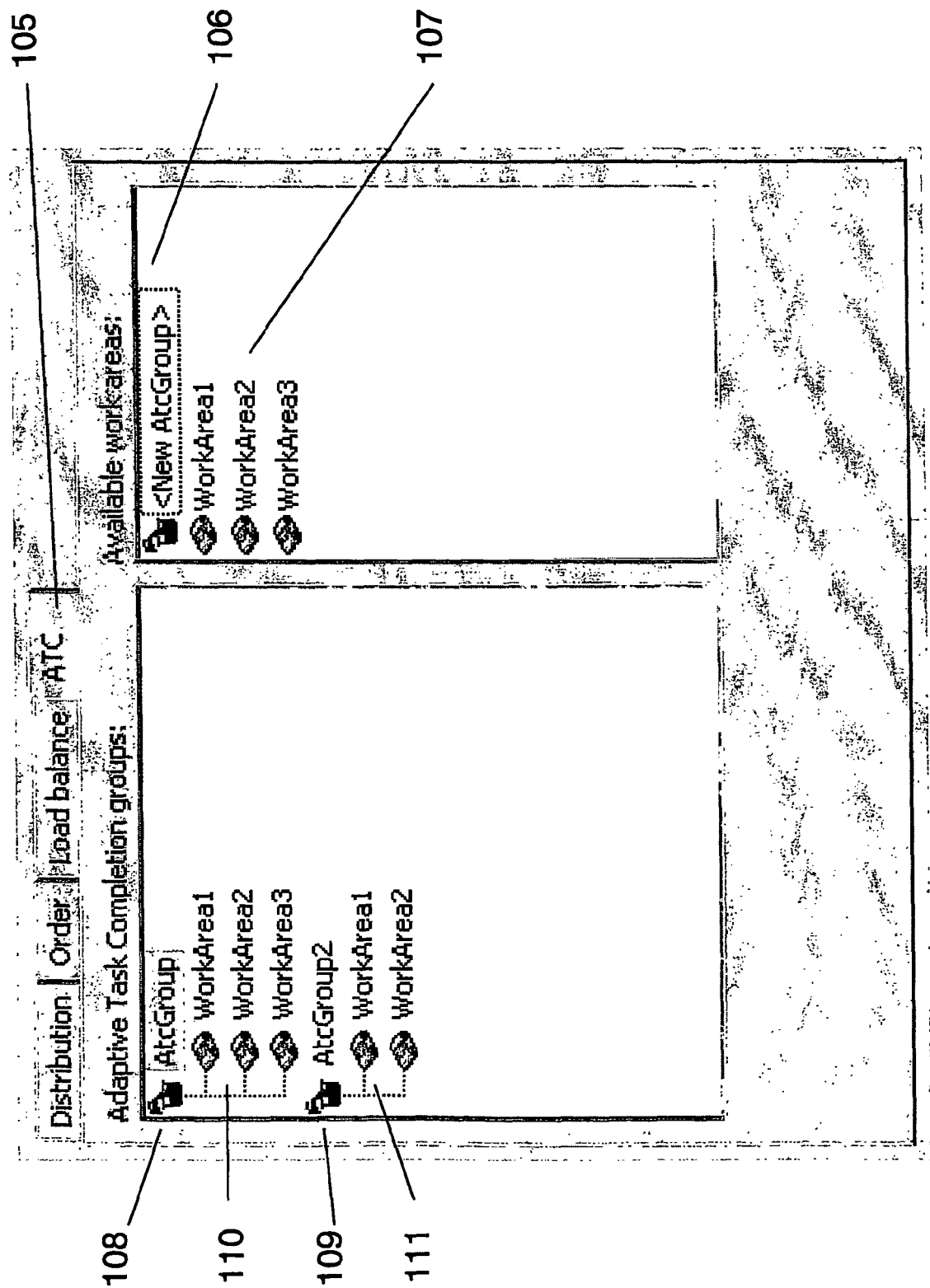
FIGS. 10-13 show schematically screen captures of parts of a graphical user interface of a system for carrying out an adaptive procedure for moving items from a first position to a second position according to an embodiment of the invention.

A Graphical User Interface (GUI) may be used to operate or control the methods of the certain embodiments of the invention. FIGS. 10-13 show some exemplary graphic user interfaces. FIG. 10 shows how adaptive work groups, AtcGroup 108 and AtcGroup2 109 may be formed and configured. A new AtcGroup 106 or new WorkArea 107 may be dragged from the area right of interface and dropped in a position on the left of the interface and so representing in which AtcGroup a WorkArea belongs. By using the term "drag and drop" it is only intended as one example of a method of manipulation of a representation of a software object that represents a technical object that is either conceptual, or a real world object, in order to control or perform an operation.

Figure 11:
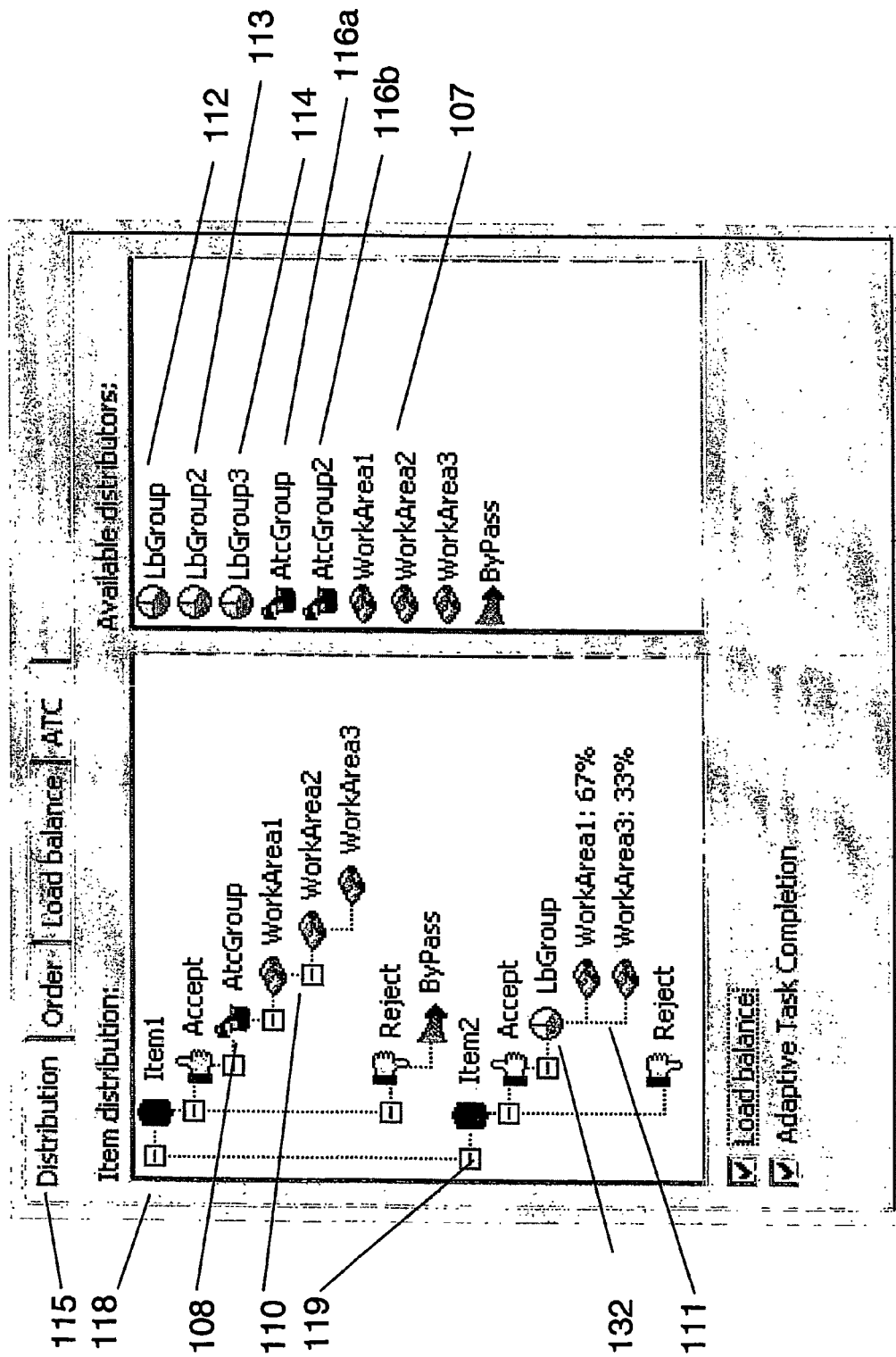

FIG. 11, Distribution interface, is visible when, for example, a tab 115 has been selected. The distributors available for configuring, such as load balancing groups LbGroups 112, 113, 114 are shown, as are two AtcGroups shown 116a, 116b, and three WorkAreas shown numbered 107 according to FIG. 10. Each WorkArea once configured, 110, 111, is a software representation of a work area of a machine or robot, (10, 11, 12 of FIGS. 1-4). These objects may be configured into Distributions arranged according to the product or item handled by dragging and dropping, to form an item distribution such as the two shown in the left side of the interface. Item distribution Item1, here numbered as 118, is shown to include one AtcGroup, 108, and three work areas shown here as 108a, 108b, 108c; a Reject function with a bypass element is also shown.

Item distribution Item2 is shown indicated by number 119, and Item2 includes an example of a load balancing group LbGroup 132, in which the work is to be balanced 33%-67% between work areas 111, ie WorkArea 1 and WorkArea3 in this example.

Figure 12:
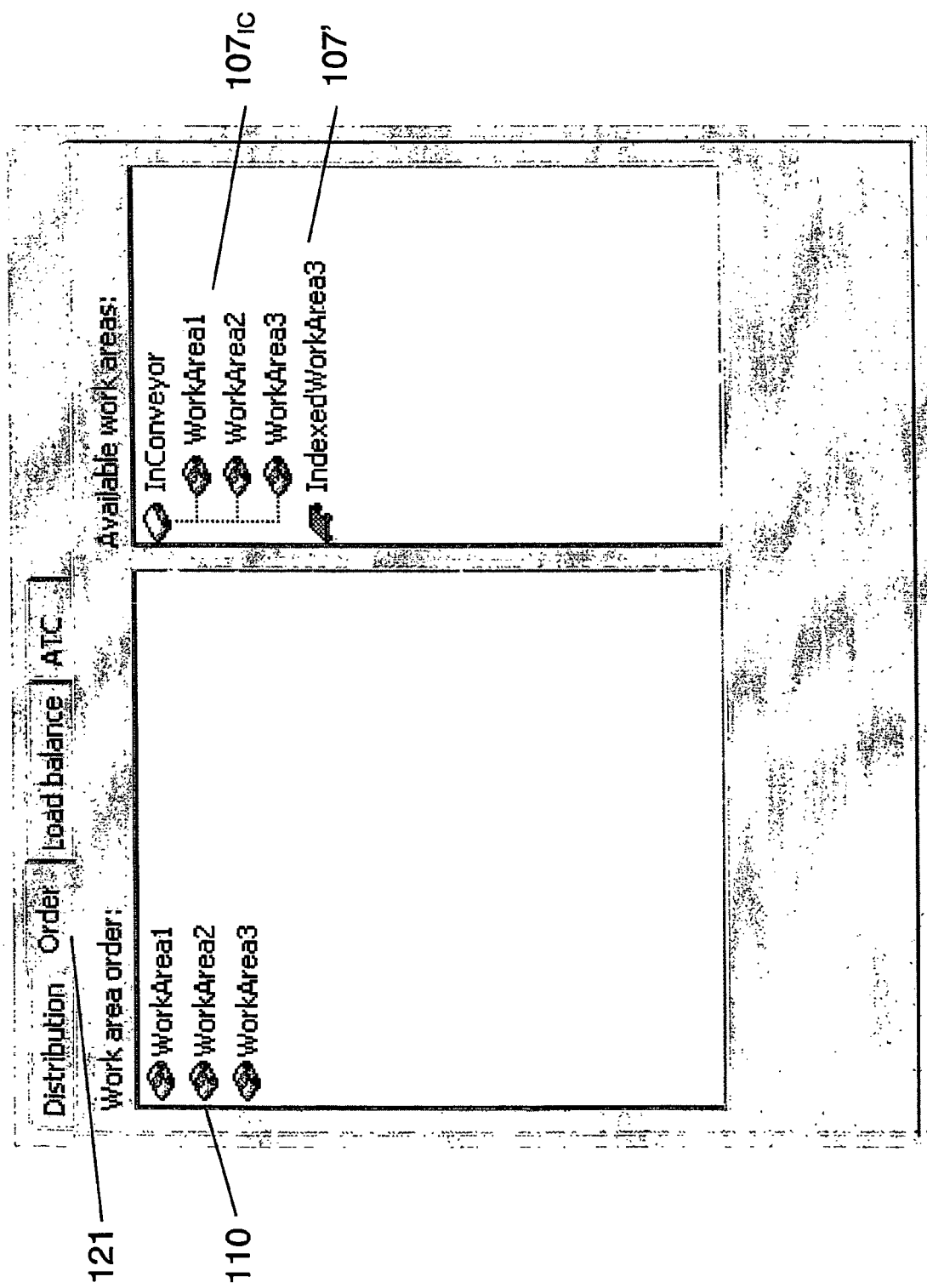

FIG. 12 shows the Order interface selected, for example, by means of a tab 121 which provides a method for a user to determine an order in which the objects reach (the work area of) each machine or robot 10, 11, 12 to be thus picked up and placed. Thus configurable objects in the right side of the interface are three work areas $107_{IC}$ available to work from a conveyor, InConveyor; and another type of work area called IndexedWorkArea 3, shown as 107'. On the left side of the interface the order in which the objects will make contact with the work areas (and the machines in them) are shown as 110 and in the order WorkArea1, WorkArea2, and WorkArea3 are shown in number order. Further objects may be dragged and dropped from the right to the left side (or deleted by the reverse action). The order of work areas on the left may be switched by dragging and dropping on the left side.

Figure 13:
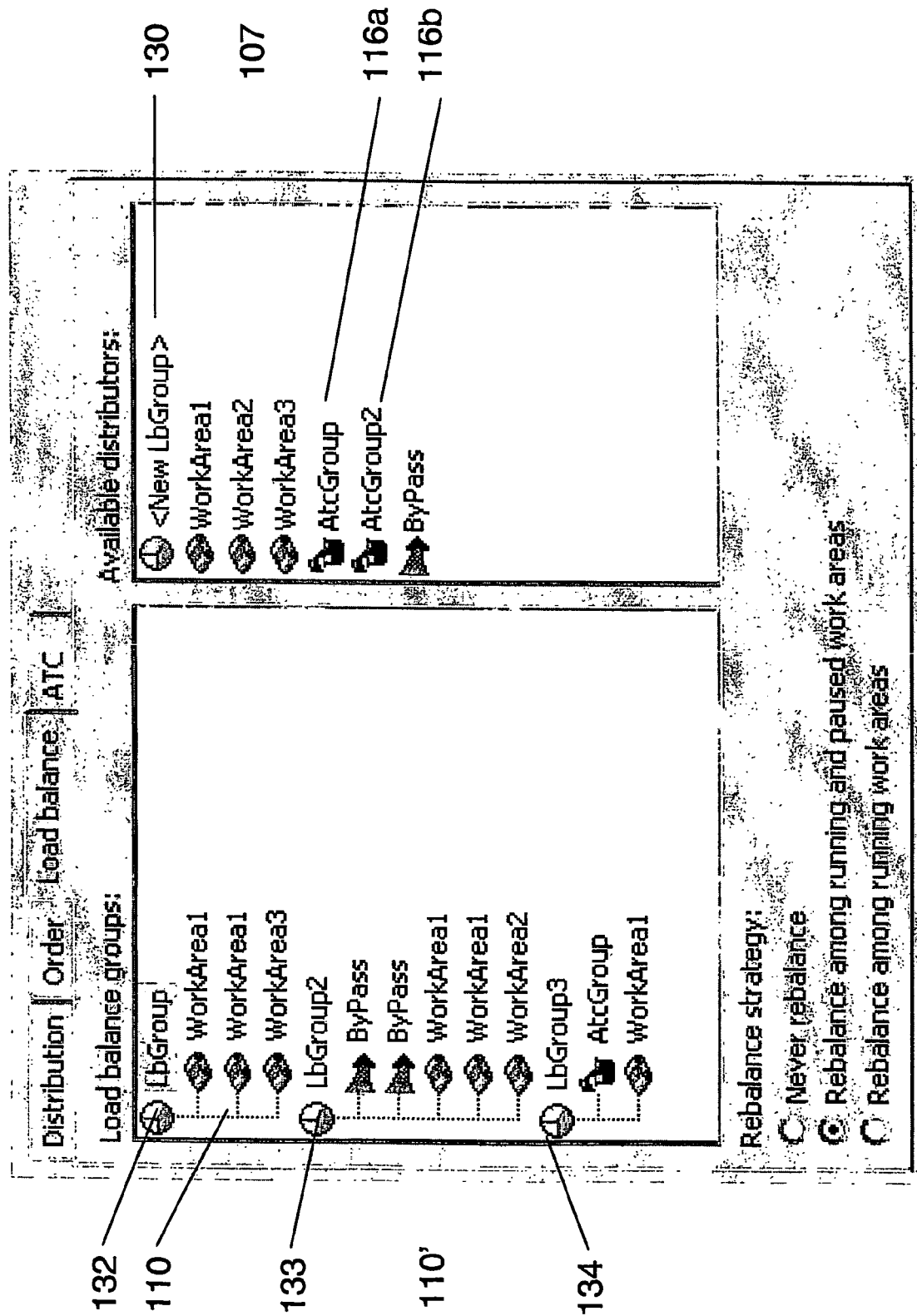

FIG. 13 shows an interface for selecting one or more Load balancing functions according to a further and advantageous embodiment. The available distributors on the right side which may be included in the configuration on the left side of the interface include first a new load balancing group, New LbGroup 130, WorkAreas 107, AtcGroups 116a, 116b, and a Bypass function. The load balance groups shown configured in the left part of the interface include three load balancing groups, LbGroup 132, LbGroup2 133 and LbGroup3 134. LbGroup 132 includes the three WorkAreas 110. The second load balancing group LbGroup2 shows two Bypass areas as well as three WorkAreas 110', which may or may not be the same as the previously used WorkAreas. The third load balancing group LbGroup2 shows an Atc group and one WorkArea.

It should be noted that while the above describes exemplifying embodiments of the invention, there are several variations and modifications which may be made to the disclosed solution without departing from the scope of the present invention as defined in the appended claims.

The invention claimed is:

1. A method for controlling a plurality of machines configured to pick up an item from one of a plurality of first positions and place the item in one of a plurality of second positions, the method comprising:
provding with a sensor member data on said first positions to a control member configured to control a plurality of machines each configured to pick the item from one of said first positions and place the item in one of said second positions,
sending a message from a master process of the control member comprising one or more of said first positions to a machine controller of all said machines controlled by said control member,
sending a message from said control member to all said machine controllers of said machines with an indicator member specifying which of the one or more first positions shall be used,
picking up with one of the machines an item from said one of first positions to be used and moving the item to one of the second positions,
receiving with said control member from the machine controller of one of said machines a message that said one of said first positions has been used, and
sending from the control member to the machine controllers of the machines that said one of said first positions has been used and an item may no longer be picked up from said one of said first positions.

2. The method according to claim 1, further comprising:
sending a message with said control member comprising said first position, or more said first positions, to all said machines controlled by the control member in which message each said first position is marked with a status of used or not.

3. The method according to claim 1, further comprising:
receiving at one of said machines the message comprising one or more said first positions,
handling an item placed one of the one or more of said first positions, and
sending a message to the control member comprising the information that one or more of said first positions where said item was handled has been used.

4. The method according to claim 1, further comprising:
updating in said control member a marker of one of said first positions to read used, and
sending from the control member to all machines controlled by said control member a message that a status of the said first position consumed is equal to used.

5. The method according to claim 1, further comprising:
selecting with a control member one or more specific said first positions to be handled by a specific machine.

6. The method according to claim 5, wherein the control member uses an algorithm to select one of said first positions to be handled by one specific machine of all machines.

7. The method according to claim 5, wherein the control member carries out a repeated triggering of a first position.

8. The method according to claim 1, further comprising:
registering said first position of the item together with a unique identity member, and marking each said first position with a status of used or not.

9. The method according to claim 8, wherein the unique identity member takes the form of a number.

10. The method according to claim 9, wherein the unique identity member takes the form of an alphanumeric string.

11. The method according to claim 1, further comprising:
allocating one of said first positions to a specific machine dependent on load balancing for a plurality of machines controlled by the control member.

12. The method according to claim 11, further comprising:
allocating said first position to a specific machine dependent on load balancing for all of the machines controlled by the control member.

13. The method according to claim 1, further comprising: allocating one of said first positions to a specific machine dependent on a stoppage that has occurred in a work group controlled by the control member.

14. The method according to claim 1, further comprising: allocating one of said first positions to a specific machine dependent on a removal from service of another specific machine in the work group controlled by the control member.

15. A computer program product, comprising:
a non-transitory computer readable medium; and
computer code and/or software code portions recorded on the non-transitory computer readable medium which when loaded into a computer or processor will make the computer or processor perform a method for controlling plurality of machines configured to pick up an item from one of a plurality of first positions and place the item in one of a plurality of second positions, the method comprising providing with a sensor member data on said first positions to a control member configured to control a plurality of machines each configured to pick the item from one of said first positions and place the item in one of said second positions, sending a message from a master process of the control member comprising one or more of said first positions to a machine controller of all said machines controlled by said control member, sending a message from said control member to all said machine controllers of said machines with an indicator member specifying which of the one or more first positions shall be used, picking up with one of the machines an item from said one of first positions to be used and moving the item to one of the second positions, receiving with said control member from the machine controller of one of said machines a message that said one of said first positions has been used, and sending from the control member to the machine controllers of the machines that said one of said first positions has been used and an item may no longer be picked up from said one of said first positions.

\* \* \* \* \*